United States Patent [19]
Koh

[11] Patent Number: 6,104,745
[45] Date of Patent: Aug. 15, 2000

[54] TRANSCEIVER FOR PERFORMING TIME DIVISION FULL DUPLEX SPREAD SPECTRUM COMMUNICATION

[75] Inventor: Hyung Koh, Yongin, Rep. of Korea

[73] Assignee: Samsung Electronics Co., Ltd., Rep. of Korea

[21] Appl. No.: 08/883,023

[22] Filed: Jun. 26, 1997

[30] Foreign Application Priority Data

Jun. 30, 1996 [KR] Rep. of Korea ............. 96-26962

[51] Int. Cl.$^7$ ........................................ A61F 2/06
[52] U.S. Cl. ..................... 375/130; 375/219; 370/276
[58] Field of Search ........................... 375/200, 208, 375/219, 221, 283; 370/276, 270, 280, 282, 284, 290, 321, 323, 337; 455/73, 78, 83, 80

[56] References Cited

U.S. PATENT DOCUMENTS

| | | | |
|---|---|---|---|
| 5,010,557 | 4/1991 | Chung | 342/44 |
| 5,398,258 | 3/1995 | Su et al. | 375/200 |
| 5,564,076 | 10/1996 | Auvray | 455/76 |
| 5,790,536 | 8/1998 | Mahany et al. | 370/428 |
| 5,805,582 | 9/1998 | Snelling et al. | 370/337 |
| 5,828,692 | 10/1998 | Walley | 375/200 |
| 5,878,076 | 3/1999 | Siedenberg | 375/206 |

*Primary Examiner*—Chi H. Pham
*Assistant Examiner*—Emmanuel Bayard
*Attorney, Agent, or Firm*—Dilworth & Barrese

[57] ABSTRACT

A transceiver for performing direct conversion, time division, full duplex, spread spectrum communication using differential binary phase shift modulation comprises: an antenna for respectively transmitting and receiving signals according to a transmission mode and a receiving mode; a time division duplexer, operatively coupled to the antenna, for selecting between the transmission mode and the receiving mode in a given interval, the duplexer using a control signal to switch between the modes; an oscillator for providing an oscillation frequency; a phase shifter, operatively coupled to the oscillator, for shifting the oscillation frequency to a given phase; a first frequency mixer, operatively coupled to the duplexer and the oscillator, for generating a first base band signal by synthesizing the oscillation frequency and a signal received from the antenna through the duplexer in receiving mode; a second frequency mixer, operatively coupled to the duplexer and the phase shifter, for generating a second base band signal by synthesizing the phase shifted oscillation frequency and the received signal from a the duplexer; a demodulator, operatively coupled to the first and second frequency mixers, for generating pseudo noise data by decoding the first and second base band signals; a filter for converting a square wave signal of pseudo noise data to a sine wave signal of the same; and a third frequency mixer, operatively coupled to the filter, for generating a transmission signal by synthesizing the sine wave and the oscillation frequency, the transmission signal being provided to the antenna through the duplexer for transmission in the transmission mode.

9 Claims, 2 Drawing Sheets

TRANSCEIVER FOR PERFORMING TIME DIVISION FULL DUPLEX SPREAD SPECTRUM COMMUNICATION

BACKGROUND OF THE INVENTION

1. Field of the Invention

The present invention relates to a transceiver for performing direct conversion, time division, full duplex, spread spectrum communication according to digital wide band modulation and demodulation associated with a differential binary phase shift keying technique.

2. Description of the Related Art

Referring to FIG. 1, an antenna 110 is shown which both receives signals from the air and transmits modulated and amplified signals into the air. A time division duplexer 112, operatively coupled to the antenna 110, switches between transmission mode and receiving mode in a given time interval. The transceiver is set to receiving mode when a switch of the duplexer 112 is switched to a first terminal S1. The transceiver is set to transmission mode when the same switch is switched to a second terminal S2. Switching of the switch of the duplexer is controlled by a control signal C1 provided by a controller (not shown) which controls the transceiver overall. A low noise amplifier LNA 114, operatively coupled to the terminal S1 of the duplexer 112, amplifies a received signal from the time division duplexer 112 by a given level. A first band pass filter BPF 116 receives the amplified received signal and passes only the portion of the signal which is within a given frequency band. Further, a filter 124 receives a square wave signal which includes pseudo noise data (PN+data) and converts such signal to a sine wave signal which includes the PN+data by low pass filtering.

A first phase-locked loop PLL 120, operatively coupled to the filter 124, obtains a fme variable frequency by frequency synthesizing using a stabilized oscillator. The first PLL 120 oscillates a high frequency modulated by the PN+data of the sine wave signal from the filter 124. A first frequency mixer 118, operatively coupled to the first PLL 120 and the first BPF 116, produces a first intermediate frequency signal by attenuating the signal received from the first BPF 116 by the oscillation frequency from the first PLL 120. The second BPF 122, operatively coupled to the mixer 118, passes only the first intermediate frequency. A signal identical to the control signal C1 of the time division duplexer 112 is received and switched to the first switch terminal S1 in receiving mode and switched to the second switch terminal S2 in transmission mode by the first PLL.

A second phase-locked loop PLL 130 produces first and second oscillation frequencies VS 1 (first VS) and VS 2 (second VS) by a control voltage CV transmitted from outside. At this time, the second PLL 130 transmits the first oscillation frequency VS 1 in receiving mode and the second oscillation frequency VS 2 in transmission mode in conjunction with the signal identical to the control signal C1. A demodulator 126, operatively coupled to the second PLL 130 and the second BPF 122, converts the first intermediate frequency passed from the second BPF 122 to a second intermediate frequency via synthesis with the first oscillation frequency VS 1. The demodulator 126 then amplifies such signal and demodulates it to the PN+data. A second frequency mixer 132, operatively coupled to the first PLL 120 and the second PLL 130, produces a transmission signal by synthesizing the second oscillation frequency VS2 from the second PLL 130 and the oscillation frequency from the first PLL 120. A third BPF 134, operatively coupled to the mixer 132, transmits only a transmission signal within a desired band after receiving the transmission signal from the second frequency mixer 132. A power amplifier 136, operatively coupled between the third BPF 134 and terminal S2 of the duplexer 112, amplifies the transmission signal passed from the BPF 134 by a desired power factor.

The time division duplexer 112 transmits a signal received by the antenna 110 when it is switched to the first terminal S1, in receiving mode, by the control signal C1. The received signal is amplified by the LNA 114, filtered by the first BPF 116 and provided to the first frequency mixer 118. The received signal is converted to the first intermediate frequency signal by the first PLL 120, filtered by the second BPF 122 and converted to the second intermediate frequency signal by the demodulator 126 to become the modulated PN+data. The second frequency mixer 132 produces a transmission signal by synthesizing the second oscillation frequency VS2 from the second PLL 130 and the oscillation frequency from the first PLL 120. Further, the transmission signal is filtered by the third BPF 134 and amplified by the power amplifier 136. At this time, the time division duplexer 112 is switched to the second switch terminal S2 and the amplified transmission signal is transmitted through the antenna 110 into the air.

As a result of this double conversion time division method employed in conventional transceivers, time division duplex (TDD) noise is produced due to the on/off operation of the second PLL 130. Further, there exists unnecessary frequency components due to spurious and harmonic ingredients produced in the two oscillation circuits. Still further, there is considerable circuit complexity associated with the demodulator 126 due to the use of the first PLL 120 and the second PLL 130.

SUMMARY OF THE INVENTION

It is an object of the present invention to provide a transceiver for performing direct conversion, time division, full duplex, spread spectrum communication which advantageously eliminates TDD noise by not relying on an on/off operation of an oscillation circuit according to a time division period. The transceiver accomplishes such by using a direct conversion, time division, full duplex, spread spectrum communication method according to a digital wide band conversion method associated with differential binary phase shift keying modulation.

It is another object of the present invention to provide a transceiver for performing direct conversion, time division, full duplex, spread spectrum communication having a simple circuit design using one oscillation circuit and suppressing a frequency of spurious and harmonic ingredients by utilizing a direct conversion, time division, full duplex, spread spectrum communication method according to a digital wide band conversion method associated with differential binary phase shift keying modulation.

It is a further object of the present invention to provide a transceiver for performing direct conversion, time division, full duplex, spread spectrum communication having a demodulator simplified due to the implementation of direct conversion receiving by utilizing a direct conversion, time division, full duplex, spread spectrum communication method according to a digital wide band conversion method associated with differential binary phase shift keying modulation.

In one aspect of the invention, a transceiver for performing direct conversion, time division, full duplex, spread spectrum communication using differential binary phase shift modulation comprises: an antenna for respectively transmitting and receiving signals according to a transmission mode and a receiving mode; a time division duplexer, operatively coupled to the antenna, for selecting between the transmission mode and the receiving mode in a given interval; an oscillator for providing an oscillation frequency; a phase shifter, operatively coupled to the oscillator, for shifting the oscillation frequency to a given phase; a first frequency mixer, operatively coupled to the duplexer and the oscillator, for generating a first base band signal by synthesizing the oscillation frequency and a signal received from the antenna through the duplexer in receiving mode; a second frequency mixer, operatively coupled to the duplexer and the phase shifter, for generating a second base band signal by synthesizing the phase shifted oscillation frequency and the received signal from the duplexer; a demodulator, operatively coupled to the first and second frequency mixers, for generating pseudo noise data by decoding the first and second base band signals; a filter for converting a square wave signal of pseudo noise data to a sine wave signal of the same; and a third frequency mixer, operatively coupled to the filter, for generating a transmission signal by synthesizing the sine wave and the oscillation frequency, the transmission signal being provided to the antenna through the duplexer for transmission in the transmission mode.

These and other objects, features and advantages of the present invention will become apparent from the following detailed description of illustrative embodiments thereof, which is to be read in connection with the accompanying drawings, in which like reference symbols indicate the same or similar components.

DETAILED DESCRIPTION OF PREFERRED EMBODIMENTS

Figure 2:
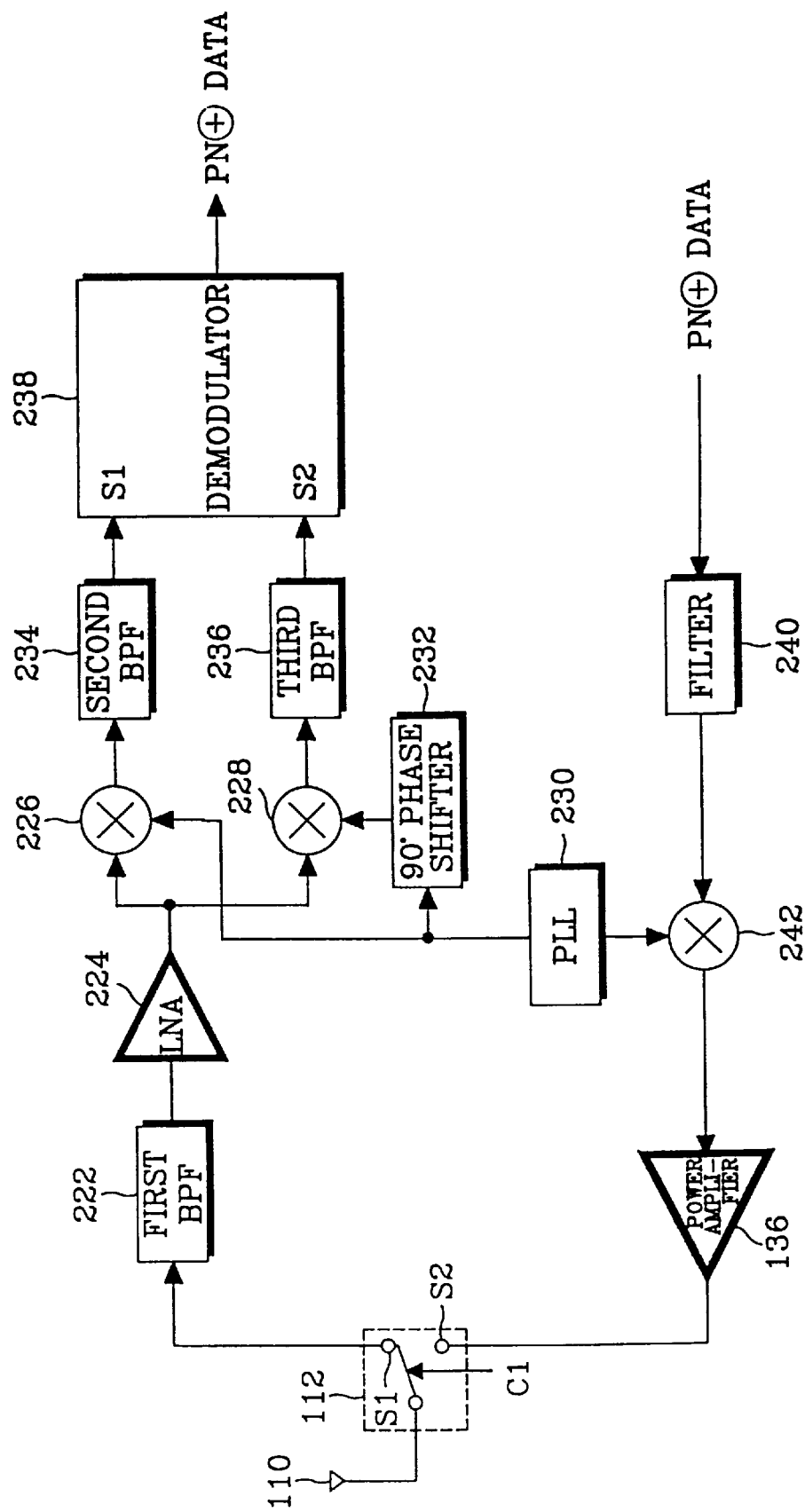
FIG. 2 is a block diagram for illustrating a transceiver of the present invention for performing direct conversion, time division, full duplex, spread spectrum communication according to a digital wide band conversion method associated with differential binary phase shift keying modulation.

Referring to FIG. 2, a transceiver according to the invention is shown. Specifically, an antenna 110 is shown which both receives a tuned signal and transmits a modified and amplified signal into the air. A time division duplexer 112, operatively coupled to the antenna 110, switches from transmission mode to receiving mode in a given interval, and vice versa. The transceiver is set to receiving mode when a switch of the duplexer 112 is switched to a first terminal S1. The transceiver is set to transmission mode when the same switch is switched to a second terminal S2. Switching of the switch of the duplexer is controlled by a control signal C1 provided by a controller (not shown). A first BPF 222, operatively coupled to terminal S1 of the duplexer 1 12, is provided with a signal received from the antenna 110 and passes only the portion of the received signal which is within a given frequency band. An LNA 224, operatively coupled to the first BPF 222, amplifies the filtered received signal from the first BPF 222 by a given level. A phase-locked loop PLL 230, using a frequency mixer, generates a fme oscillation frequency by synthesizing a frequency using a stabilized crystal oscillator.

A first frequency mixer 226, operatively coupled to the LNA 224 and the PLL 230, generates an in-phase first base band signal S1. A 90 degree phase shifter 232 generates a 90 degree phase shifted frequency by receiving and processing the oscillation frequency from the PLL 230. A second frequency mixer 228, operatively coupled to the LNA 224 and the 90 degree phase shifter 232, generates a second base band signal S2 demodulated orthogonally by synthesizing an output from the 90 degree phase shifter 232 and a high frequency from the LNA 224. A second BPF 234, operatively coupled to the first frequency mixer 226, passes only the first base band signal S1 and a third BPF 236, operatively coupled to the second frequency mixer 228, passes only the second base band signal S2. A demodulator 238, operatively coupled to the second BPF 234 and the third BPF 236, generates PN+data by demodulating the first and second base band signals S1 and S2.

A filter 240 converts a square wave signal of PN+data to a sine wave signal of the same. A third frequency mixer 242, operatively coupled to the filter 240, performs modulation by synthesizing the sine wave signal and the oscillation frequency from the PLL 230. A power amplifier 136, operatively coupled between the third frequency mixer 242 and terminal S2 of the duplexer 112, amplifies the signal modulated by the third frequency mixer 242 and provides it to the time division duplexer 112. At this time, the duplexer 112 is switched to the second switch terminal S2 and the amplified transmission signal is transmitted through the antenna 110 into the air.

Describing the operation of the inventive circuit with reference to FIG. 2, the control signal C1 switches the switching terminal of the time division duplexer 112 to the first terminal S1 to receive a signal from the antenna 110 in the receiving mode. The received signal is filtered through the first BPF 222 and amplified by the LNA 224. The amplified signal is mixed by the first frequency mixer 226 with the oscillation frequency generated by the PLL 230 and converted into the first base band signal S1. The amplified signal is also mixed by the second frequency mixer 228 with the output signal of the 90 degree phase shifter 232 and demodulated into the second base band signal S2. The first and second base band signals S1 and S2 are filtered respectively through the second and third BPF 234 and 236. The signals are then applied to the demodulator 238, which demodulates the first and second base band signal S1 and S2 to generate the PN+data.

In the transmission mode, the filter 240 receives the PN+data to generate a sine wave signal, which is mixed by the third frequency mixer 242 with the oscillation signal from the PLL 230 thereby generating a signal to transmit. The signal is amplified by the power amplifier 136. Then, the time division duplexer 112 switches to the second terminal S2 to transmit the amplified signal through the antenna 110 into the air.

Figure 1:
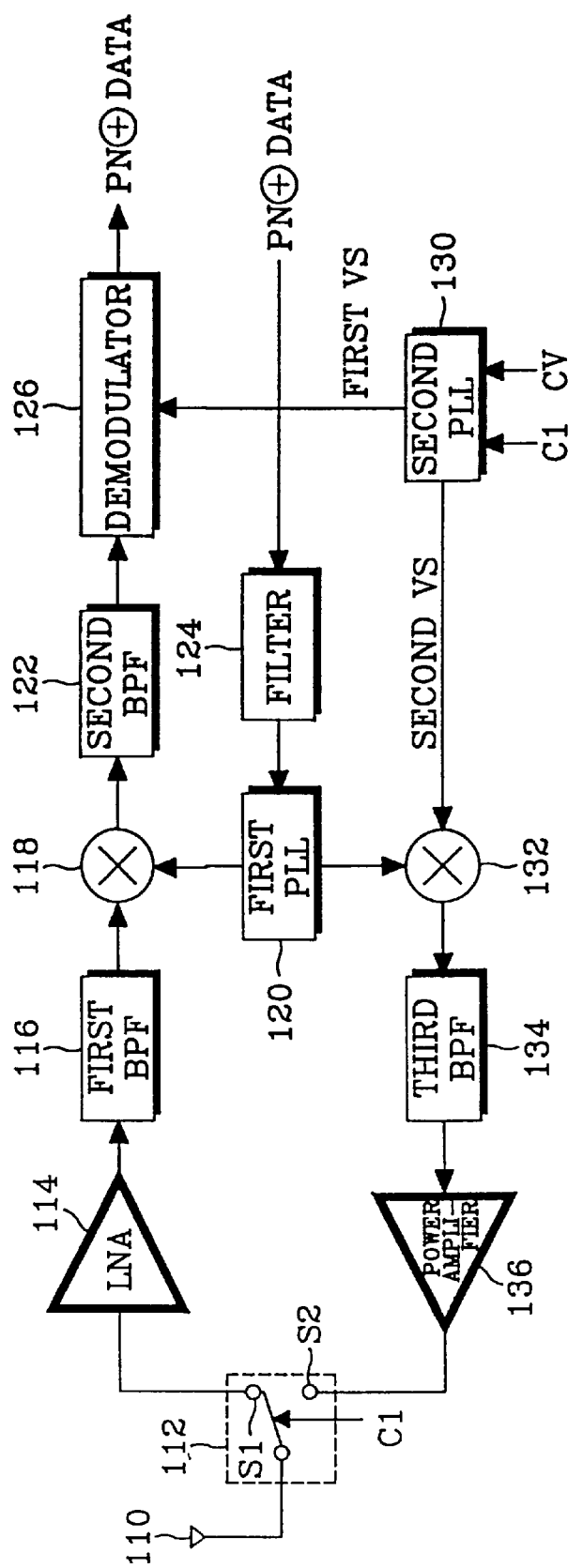
FIG. 1 is a block diagram for illustrating a conventional transceiver for performing double conversion, time division, full duplex, spread spectrum communication using a conventional wide band frequency shift keying technique.

Accordingly, as exemplified above, the present invention provides a unique transceiver arrangement for performing direct conversion, time division, full duplex, spread spectrum communication according to the digital wide band conversion method associated with differential binary phase shift keying modulation. Advantageously, the invention provides that the oscillation circuit PLL 230 remains on compared with the on/off operation of the conventional system (FIG. 1), thus preventing time division duplex (TDD) noise. Moreover, a single oscillation circuit is used thus simplifying the transceiver such that spurious and harmonic noises are considerably reduced. In addition, the treatment and, thus, operation of the demodulator is simplified.

Although illustrative embodiments of the present invention have been described herein with reference to the accompanying drawings, it is to be understood that the invention is not limited to those precise embodiments, and that various other changes and modifications may be affected therein by one skilled, in the art without departing from the scope or spirit of the invention.

What is claimed is:

1. A transceiver for performing direct conversion, time division, full duplex, spread spectrum communication using differential binary phase shift modulation, the transceiver comprising:

an antenna for respectively transmitting and receiving signals according to a transmission mode and a receiving mode;

a time division duplexer, operatively coupled to the antenna, for selecting between the transmission mode and the receiving mode in a given interval;

an oscillator for providing an oscillation frequency;

a phase shifter, operatively coupled to the oscillator, for shifting the oscillation frequency to a given phase;

a first frequency mixer, operatively coupled to the duplexer and the oscillator, for generating a first base band signal by synthesizing the oscillation frequency and a signal received from the antenna through the duplexer in a receiving mode;

a second frequency mixer, operatively coupled to the duplexer and the phase shifter, for generating a second base band signal by synthesizing the phase shifted oscillation frequency and the received signal from the duplexer;

a demodulator, operatively coupled to the first and second frequency mixers, said demodulator passing analog signals therethrough and for generating pseudo noise data by decoding the first and second base band signals, said second base band signal substantially following the first base band signal with a shift of approximately 90°;

a filtering for converting a square wave signal of pseudo noise data to a sine wave signal of the same; and a third frequency mixer, operatively coupled to the filter, for generating a transmission signal by synthesizing the sine wave and the oscillation frequency, the transmission signal being provided to the antenna through the duplexer for transmission in the transmission mode.

2. The transceiver as defined in claim 1, further comprising a first filter, operatively coupled to the duplexer, for passing a signal within a given frequency band received from the duplexer in the receiving mode.

3. The transceiver as defined in claim 1, further comprising an amplifier, operatively coupled to the duplexer, for amplifying the received signal from the duplexer and respectively providing the amplified received signal to the first and second frequency mixers.

4. The transceiver as defined in claim 1, further comprising a second filter, operatively coupled to the first frequency mixer, for passing substantially only the first base band signal to the demodulator.

5. The transceiver as defined in claim 1, further comprising a third filter, operatively coupled to the second frequency mixer, for passing substantially only the second base band signal to the demodulator.

6. The transceiver as defined in claim 1, further comprising a power amplifier, operatively coupled to the third frequency mixer, for amplifying the transmission signal.

7. The transceiver as defined in claim 1, wherein the second base band signal is demodulated orthogonally.

8. A transceiver for performing direct conversion, time division, full duplex, spread spectrum communication using differential binary phase shift modulation, the transceiver comprising:

means for respectively transmitting and receiving signals according to a transmission mode and a receiving mode;

switching means, operatively coupled to the transmitting/receiving means, for selecting between the transmission mode and the receiving mode in a given interval;

oscillating means for providing an oscillation frequency;

phase shifting means, operatively coupled to the oscillating means, for shifting the oscillation frequency to a given phase;

first frequency mixing means, operatively coupled to the switching means and the oscillating means, for generating a first base band signal by synthesizing the oscillation frequency and a signal received from the transmitting/receiving means through the switching means in a receiving mode;

second frequency mixing means, operatively coupled to the switching means and the phase shifting means, for generating a second base band signal by synthesizing the phase shifted oscillation frequency and the received signal from the switching means;

demodulating means, operatively coupled to the first and second frequency mixing means, said demodulating means passing analog signals therethrough and for generating noise data by decoding the first and second base band signals, said second base band signal substantially following the first base band signal with a shift of approximately 90°;

filtering means for converting a square wave signal of pseudo noise data to a sine wave signal of the same; and third frequency mixing means, operatively coupled to the filing means, for generating a transmission signal by synthesizing the sine wave and the oscillation frequency, the transmission signal being provided to the transmitting/receiving means through the switching means for transmission in the transmission mode.

9. The transceiver as defined in claim 8, wherein the second base band signal is demodulated orthogonally.

* * * * *